United States Patent
Rogers

[15] 3,656,460
[45] Apr. 18, 1972

[54] SMOG CONTROL DEVICE FOR INTERNAL COMBUSTION ENGINE

[72] Inventor: Joe E. Rogers, Waverly, Kans. 66871
[22] Filed: Sept. 17, 1970
[21] Appl. No.: 73,146

[52] U.S. Cl. .................................. 123/41.86, 123/119 B
[51] Int. Cl. ........................................................ F02f 9/02
[58] Field of Search .................. 123/119 B, 119 A, 41.86

[56] References Cited

UNITED STATES PATENTS

| | | | |
|---|---|---|---|
| 3,381,673 | 5/1968 | Drysdale | 123/119 B |
| 3,191,586 | 6/1965 | Turra et al. | 123/119 B |
| 3,362,386 | 1/1968 | McMahon | 123/119 B |
| 2,408,846 | 10/1946 | Golden et al. | 123/119 A |
| 2,639,701 | 5/1953 | Bales | 123/119 B |
| 3,272,192 | 9/1966 | Jensen et al. | 123/119 B |
| 3,170,447 | 2/1965 | Svoren et al. | 123/119 B |
| 3,246,639 | 4/1966 | Oliver | 123/119 B |

Primary Examiner—William E. Wayner
Attorney—Don M. Bradley

[57] ABSTRACT

A smog control device for an internal combustion engine utilizes a first conduit which communicates the engine crankcase with the suction head of the engine to draw gases accumulating in the crankcase from the latter when the suction head is maximized. A second conduit which communicates the engine crankcase with the air passage leading into the engine draws gases accumulated in the crankcase from the latter in response to the flow of air through the air passage. A third conduit communicates the engine crankcase with the atmosphere to supply a flow of fresh air to the crankcase whenever gases are flowing through either of the first or second conduits to thereby prevent any vacuum or crankcase pressure balance in the engine. The conduits are arranged to cooperate in maintaining a perfect pressure balance in the engine at all times without the need for any valves or other moving parts. To promote the efficient combustion of fuel and thereby further reduce the accumulation of gases in the engine crankcase, a fuel additive in the form of burned exhaust gases in introduced into the engine at the inlet of the air passage. This additive also permits the engine to run on unleaded gasoline, further reducing air pollution from the engine.

8 Claims, 4 Drawing Figures

PATENTED APR 18 1972
3,656,460
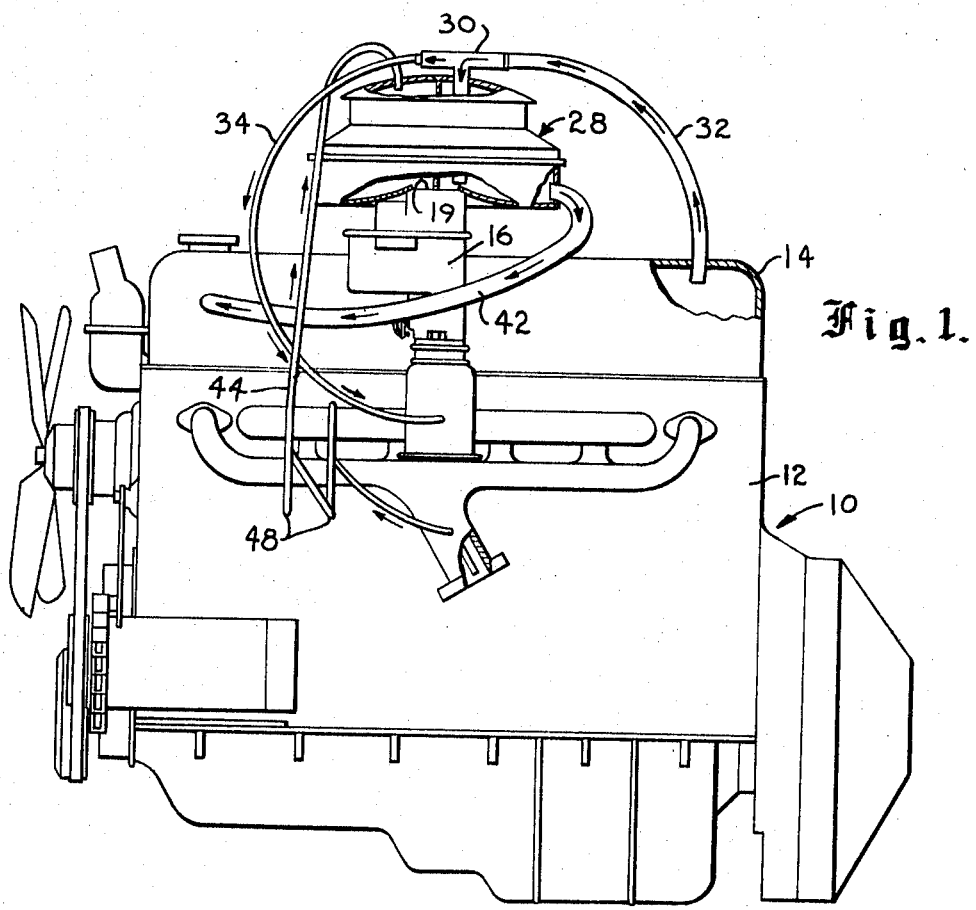
Fig. 1.
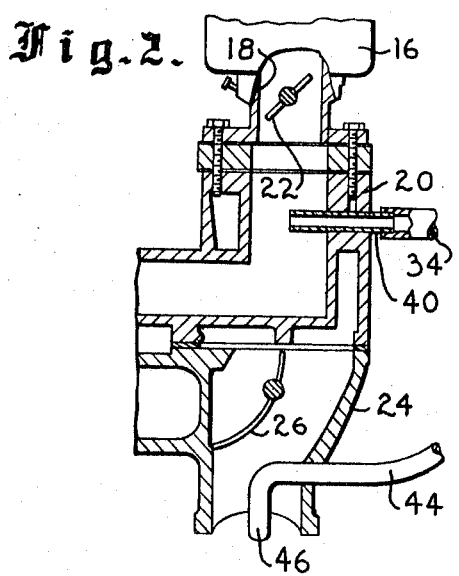
Fig. 2.
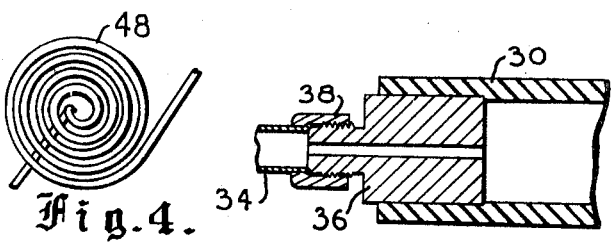
Fig. 4.
Fig. 3.
INVENTOR
Joe E. Rogers
BY Ron M. Bradley
ATTORNEY

SMOG CONTROL DEVICE FOR INTERNAL COMBUSTION ENGINE

This invention relates to apparatus for reducing the emission of unburned hydrocarbons from internal combustion engines.

Considerable interest has been shown in recent years for devices designed to reduce the extent of air pollution by internal combustion engines. Such engines are estimated to contribute well over 50 percent of the total pollutants to the atmosphere. While the prior devices for controlling emissions from internal combustion engines have been partially successful, they have suffered from several deficiencies. First of all, many of the devices of the prior art operate only at either high or low engine vacuum, but not at both, thus giving incomplete emission control. Secondly, it has heretofore been necessary to include valves and other moving parts in engine smog control devices thus making their initial cost high and creating a maintenance problem. This problem is twofold. First it is difficult to obtain competent maintenance service because of a general shortage of personnel and a lack of training. Second, automobile owners frequently neglect their cars and do not procure maintenance service when it is needed. Finally, all previous smog control devices for internal combustion engines have suffered in efficiency because of their tendency to create a partial vacuum in the engine crankcase, thereby increasing the quantity of the same unburned gases which the device is intended to eliminate.

It is, therefore, an object of the present invention to provide a smog control device for internal combustion engines wherein no moving parts are utilized, thus lowering the initial cost of the device and essentially eliminating the need for any maintenance subsequent to installation, thereby avoiding the problems of owner neglect.

Another object of the invention is a smog control device which is operable at all throttle positions, thereby providing effective emission control at all times.

Still another object of the invention is to provide a smog control device wherein combustion gases are effectively drawn from the engine crankcase but where a flow of air into the crankcase always assures a perfect pressure balance and prevents any vacuum or crankcase pressure buildup within the engine which would reduce the effectiveness of the device.

Still another object of the invention is to provide a device for eliminating the emission of lead compounds from an internal combustion engine by providing an engine additive in the form of exhaust gases to replace the lead additives now utilized.

In the drawing:

FIG. 1 is a side elevational view of an automobile engine with the smog control apparatus of the present invention being coupled therewith;

FIG. 2 is an enlarged, cross-sectional view beneath the carburetor of the engine illustrating the intake and exhaust manifolds and the manner in which certain components of the apparatus of the invention are coupled with these manifolds;

FIG. 3 is an enlarged, partial cross-sectional view through the T connector which is utilized in joining the first and second conduits of the smog control apparatus; and FIG. 4 is a front elevational view of a portion of the exhaust gas additive conduit illustrating the cooling coil which effects partial cooling of the exhaust gases prior to their introduction into the air passage of the engine.

An internal combustion engine is designated generally by the numeral 10 in FIG. 1. The engine 10 is provided with six cylinders (not shown) as is the common practice with many modern automobile engines. The engine 10 has a crankcase 12 which houses the cylinders, and the uppermost portion of the crankcase is enclosed by a cover 14. A housing 16 encloses the carburetor (not shown) of the engine 10 and also defines a passage 18 having an inlet 19 (FIG. 2) for introducing air into the engine. An intake manifold 20 directly beneath the housing 16 has an opening which presents a continuation of the air passage 18.

A throttle valve 22 in the air passage 18 is movable from an open position, permitting the flow of air through the passage to a closed position wherein no air can pass through the passage 18. Various intermediate positions of the throttle valve 22 restrict the flow of air through the passage 18 to varying degrees.

The engine 10 is also provided with an exhaust manifold 24 which presents a conduit for directing exhaust gases from the engine. A heat riser valve 26 within the exhaust manifold 24 provides means for directing the exhaust gases against the intake manifold 20 to warm the fuel and air mixture therein prior to its injection into the cylinders.

At the inlet 19 to the air passage 18, air cleaner structure 28 is provided for filtering the air prior to its passage into the engine. The structure 28 is normally of a substantially larger diameter than the inlet 19 to accommodate a filter element (not shown) and also to provide a sufficiently large drawing area to adequately supply the engine 10 with air.

A T connection 30 is disposed with its vertical leg extending into the structure 28 near the center of the latter so as to position this leg adjacent the passage inlet 19. The T connection 30 is spot-welded or otherwise secured to the air cleaner structure 28.

A first conduit 32 which is preferably in the form of a rubber hose, extends through an opening in the cover 14 to communicate the engine crankcase with the T connection 30. A second conduit 34 which is preferably comprised of copper tubing, is secured to the T connection 30 by means of a threaded nipple 36 (FIG. 3) projecting from the connection and a complementally threaded collar 38. The conduit 34 communicates with the passage 18 through a fitting 40 in the wall of the intake manifold 20 at a point below the throttle valve 22. A third conduit 42 which is preferably a rubber hose, has one end extending into the interior of the structure 28 adjacent the outer periphery of the latter, while the opposite end passes through an opening in the cover 14.

An exhaust conduit 44 communicates the exhaust manifold 24 with the interior of the air cleaner structure 28. The exhaust conduit 44 extends into the exhaust manifold 24 and is provided with a depending leg 46 within the manifold 24 for purposes to be made clear hereinafter. In addition, an intermediate stretch of the conduit 44 is provided with a pair of cooling coils 48, one of which is shown in detail in FIG. 4.

It is well known that in the operation of any internal combustion engine there is an accumulation of gases in the engine crankcase. These gases are commonly discharged from the crankcase by the engine exhaust system and comprise the major portion of air pollutants which are attributable to internal combustion engines. The gases which accumulate in the crankcase are largely the result of imperfect combustion within the engine cylinders and comprise unburned fuel vapors mixed with lubricating oil from the cylinders. Because these gases are actually blown past the cylinders, they are commonly referred to as blow-by gases.

The flow of air through the passage 18 creates a suction on the vertical leg of the T connection 30 which draws the blow-by gases through the conduit 32 and into the passage 18, as indicated by the direction of the arrows in FIG. 1, for redistribution to the cylinders. When the throttle valve 22 is moved to a position restricting the flow of air through the passage 18, which is the case during deceleration or engine idle, the suction head of the engine creates a vacuum at the inlet to the conduit 34 to draw the blow-by gases from the crankcase 12 through the conduits 32 and 34 and into the engine for redistribution to the cylinders as indicated by the arrows in FIG. 1. During the passage of blow-by gases through either of the conduits 32 or 34, fresh air is introduced into the crankcase 12 through the conduit 42 which communicates the crankcase with the atmosphere. This prevents any vacuum or pressure buildup within the crankcase 12 and thereby avoids any tendency for the conduits 32 and 34 to enhance the flow of blow-by gases into the crankcase. It is to be understood, of course, that the conduits 32 and 34 operate simultaneously in most throttle positions with a portion of the blow-by gases being drawn into the air passage 18 through the T connection 30 adjacent the inlet 19 to the passage while another portion of the gases is drawn into the passage 18 at a point below the throttle valve 22 through the conduit 34. It is to be noted that the effective diameter of the conduit 34 is approximately one-half that of the conduit 32 since this ratio provides the necessary correction for the larger suction head created during closed throttle positions as compared with the smaller suction acting on the conduit 32 as a result of the flow of air through the passage 18. It is very desirable to locate the inlet to conduit 32 adjacent the uppermost portion of the crankcase 12 since at this location the blow-by gases accumulate and are present in highly concentrated quantities.

It is particularly advantageous to locate the conduit 42 at the outer periphery of the air cleaner structure 28. At this location, the flow of air through the conduit 42 is partially under the control of the flow of air into the passage 18 since air can enter the passage only as it passes upwardly through the structure 28 and past the inlet to the conduit 42. Thus, when the flow of air upwardly through the structure 28 and into the passage 18 is maximized, there is a force acting upon the conduit 42 which is counter to the direction of airflow in this conduit. On the other hand, a sufficient pressure differential exists between the passage inlet 19 and the inlet to the conduit 42 to assure the flow of air through the latter in the direction of the arrows in FIG. 1.

The engine 10 is further designated to reduce the extent of pollution from its exhaust gases by providing structure which allows the engine to burn unleaded gasoline. It is well known that the residuals from the combustion of gasoline containing lead additives are much more harmful than the residuals from the combustion of unleaded gasoline. On the other hand, many engines require the lead additives to run efficiently. It has been found, however, that by directing a portion of the exhaust gases from the exhaust manifold 24 to the intake manifold, the carbon from the exhaust gases can function as an effective substitute for the aforementioned lead additives. Exhaust conduit 44 is provided for this purpose and extends from the exhaust manifold 24 to the interior of the structure 28 at a point adjacent the inlet to the air passage 18. The flow of air through the passage creates a suction on the exhaust conduit 44 to effectively draw a portion of the exhaust gases into the air passage. It has also been found that the introduction of the warm exhaust gases into the inlet of the air passage 18 increases fuel economy. In certain instances where increased power is desired, the cooling coils 48 are included in the conduit 44, although the coils 48 may be omitted. It is, however, particularly advantageous to introduce the exhaust gases into the passage 18 adjacent the passage inlet 19 since this provides sufficient warming of the air flowing into the engine to prevent carburetor icing during extremely cold weather.

It has been found that when the apparatus of the present invention is installed upon an automobile of moderate size an increase in gas mileage of at least 2–3 m.p.g. is obtainable. Tests conducted on a working model of the invention installed upon a 1970 Chevrolet automobile manufactured by the General Motors Corporation of Detroit, Michigan, have shown that combustion efficiency of 85 to 87 percent is attainable utilizing the present invention as compared with 70 percent combustion efficiency for previously known internal combustion engine smog control devices.

It will also be appreciated that the smog control device of the present invention is particularly adapted for installation upon existing automobile engines without the requirement of expensive carburetor modifications.

Having thus described the invention, what is claimed as new and desired to be secured by Letters Patent is:

1. In an internal combustion engine which creates a suction head during operation and having a passage for introducing air into the engine, said passage having an inlet thereto, a throttle valve in said passage movable from an open to a closed position, a crankcase, and wherein imperfect fuel combustion results in the accumulation of blow-by gases in the crankcase, the improvement comprising:
   a first conduit communicating the crankcase with the passage, said first conduit having an outlet in direct communication with the passage at a point above the throttle valve for drawing gases from the crankcase in response to the flow of air through said passage;
   a second conduit communicating the crankcase with the passage at a point below the throttle valve for drawing gases from the crankcase in response to the suction head of the engine when the throttle valve has been moved to a position restricting the flow of air through the passage; and
   a third conduit communicating the crankcase with said passage, said third conduit having an inlet in indirect and restricted communication with said passage to cause a pressure differential between the passage inlet and the third conduit inlet whenever air flowing through the passage causes a negative pressure in the passage,
   whereby the flow of gases from the crankcase through either of said first and second conduits results in a compensating flow of air through said third conduit into the crankcase to preclude vacuum or pressure buildup therewithin and the flow of air into said third conduit is opposed by the flow of air into said passage.

2. The invention of claim 1, wherein said second conduit communicates with said first conduit.

3. The invention of claim 1, wherein said engine is provided with air cleaner structure at the inlet to said passage, said structure having a larger diameter than the diameter of the passage inlet, said first conduit communicating with the interior of said structure at the center thereof, and said third conduit communicating with the interior of said structure at the outer periphery thereof.

4. The invention of claim 1, said engine being provided with an exhaust conduit for directing exhaust gases from the engine, and including means for conveying a portion of said exhaust gases to said passage from said exhaust conduit.

5. The invention of claim 4, said conveying means communicating with said passage at the passage inlet.

6. The invention of claim 5, said conveying means including means for effecting partial cooling of said exhaust gases prior to delivery of the latter at said passage inlet.

7. The invention of claim 6, wherein said conveying means comprises a tubular member and said cooling means comprises a coiled section of said tubular member.

8. The invention of claim 3, wherein said third conduit communicates with said crankcase in spaced relationship to the point of communication of said first and second conduits with the crankcase whereby to cause fresh air to enter the crankcase at a location removed from the location of gases being withdrawn from the crankcase.

\* \* \* \* \*